US008352866B2

(12) United States Patent
Bethune et al.

(10) Patent No.: US 8,352,866 B2
(45) Date of Patent: Jan. 8, 2013

(54) ADAPTING A NETWORK TOPOLOGY

(75) Inventors: Iain A. Bethune, Selkirk (GB); Gordon D. Hutchison, Eastleigh (GB); Bruce J. Smith, Hampshire (GB)

(73) Assignee: International Business Machines Corporation, Armonk, NY (US)

( * ) Notice: Subject to any disclaimer, the term of this patent is extended or adjusted under 35 U.S.C. 154(b) by 456 days.

(21) Appl. No.: 12/488,999

(22) Filed: Jun. 22, 2009

(65) Prior Publication Data

US 2009/0327902 A1 Dec. 31, 2009

(30) Foreign Application Priority Data

Jun. 27, 2008 (EP) .................................... 08159242

(51) Int. Cl.
*G06F 15/177* (2006.01)
(52) U.S. Cl. .................... 715/735; 370/254; 709/226
(58) Field of Classification Search .......... 715/735–737; 370/229–240, 254–258; 709/223–226
See application file for complete search history.

(56) References Cited

U.S. PATENT DOCUMENTS

| 6,259,679 | B1 * | 7/2001 | Henderson et al. | 370/254 |
|---|---|---|---|---|
| 6,437,804 | B1 * | 8/2002 | Ibe et al. | 715/736 |
| 6,584,073 | B1 * | 6/2003 | Steele et al. | 370/254 |
| 7,058,715 | B2 * | 6/2006 | Jain et al. | 709/225 |
| 7,120,128 | B2 * | 10/2006 | Banks et al. | 370/254 |
| 7,774,445 | B1 * | 8/2010 | Weinbrecht et al. | 709/223 |
| 7,813,281 | B2 * | 10/2010 | Bolt et al. | 370/231 |
| 7,886,031 | B1 * | 2/2011 | Taylor et al. | 709/221 |
| 7,934,018 | B1 * | 4/2011 | Lavallee et al. | 709/248 |
| 2003/0233427 | A1 * | 12/2003 | Taguchi | 709/220 |
| 2004/0064543 | A1 * | 4/2004 | Ashutosh et al. | 709/224 |
| 2004/0085347 | A1 * | 5/2004 | Hagarty et al. | 345/735 |
| 2005/0086540 | A1 * | 4/2005 | Gunter et al. | 713/201 |
| 2005/0091353 | A1 * | 4/2005 | Gopisetty et al. | 709/223 |
| 2007/0078970 | A1 * | 4/2007 | Zabihi et al. | 709/224 |
| 2008/0162681 | A1 * | 7/2008 | Yellapragada et al. | 709/223 |
| 2009/0006501 | A1 * | 1/2009 | Bharadwaj et al. | 707/205 |

FOREIGN PATENT DOCUMENTS

WO WO 2008130828 A2 * 10/2008
WO WO 2009156451 A1 * 12/2009

OTHER PUBLICATIONS

Gansner and North, An open graph visualization system and its applications to software engineering, May 26, 1999, John Wiley & Sons, Ltd.*

* cited by examiner

*Primary Examiner* — Kieu Vu
*Assistant Examiner* — James T Durkin
(74) *Attorney, Agent, or Firm* — Stephen R. Tkacs; Stephen J. Walder, Jr.; Randall J. Bluestone

(57) ABSTRACT

A mechanism is provided for adapting a network topology, in which the network topology comprises a plurality of points, a plurality of connections, each connection connecting a pair of points, and a zoneset comprising a plurality of zones, each zone defining a series of points that are connected. The mechanism performs operations of receiving one or more user inputs, each user input comprising a change to a zone, performing an analysis of the or each user input, to determine one or more consistent universal changes to the zoneset, presenting an output to the user comprising one or more of the determined consistent universal changes to the zoneset, receiving a selection user input selecting a presented consistent universal change to the zoneset, and changing the zoneset according to the selected consistent universal change to the zoneset.

20 Claims, 11 Drawing Sheets

ADAPTING A NETWORK TOPOLOGY

BACKGROUND

This invention relates to a method of, and a system for, adapting a network topology.

Connections between devices in a network can be represented by a network topology. This topology represents the connections between the different components in the network, and can be a physical topology representing actual physical connections between the components, or can be a logical topology representing how communications are permitted over the existing physical network.

One such network topology is the administration of the connectivity of a fibre channel storage area network. Such a network connects storage disk systems, storage controllers, storage virtualization servers and hosts using fibre channel switches and fibre optic cables. The components of the storage area network that are connected together are each given a unique "world wide node name". An important element of a storage area network is increased reliability by the use of redundant components. To increase redundancy and throughput, each component is likely to support multiple fibre channel ports and each of these is given a unique "world wide port name". To increase redundancy and throughput, each node is also likely to be duplicated and will share with its equivalent partner nodes the particular task in the storage area network, so there is likely to be two or more paired switches, pairs of storage virtualization nodes in an input/output group, paired storage controller front ends and so on.

In the administration of the storage area network connectivity, the goal is generally to configure for the maximum possible redundancy so there are as many as possible redundant paths between any two points. Most nodes will run intelligent multipathing software that will notice a point to point path failing and fail-over to using a second path that is still open. This is ideal from a system reliability point of view. However, the creation of redundancy via storage area network connectivity administration is a more skilful task that the simple describing/configuring of the point-to-point graph of the connectivity between hosts and storage nodes in the storage area network. A well configured storage area network also results in a graph of connectivity between port names that is much more complex than the equivalent simple non-redundant graph of connectivity.

The administration of a network topology that represents a storage area network is a non-trivial task. In particular, the addition or deletion of port connections in the storage area network, when carried out manually, is a process that is heavily prone to error.

SUMMARY

According to a first illustrative embodiment, there is provided a method of adapting a network topology, the network topology comprising a plurality of points, a plurality of connections, each connection connecting a pair of points, and a zoneset comprising a plurality of zones, each zone defining a series of points that are connected. The method comprises receiving one or more user inputs from a user, wherein each of the one or more user inputs comprises a change to a zone. The method further comprises performing analysis of each of the one or more user inputs to determine one or more consistent universal changes to the zoneset, presenting an output to the user comprising one or more of the determined consistent universal changes to the zoneset, receiving a selection user input selecting a presented consistent universal change to the zoneset, and changing the zoneset according to the selected consistent universal change to the zoneset.

According to a second illustrative embodiment, there is provided a system for adapting a network topology, the network topology comprising a plurality of points, a plurality of connections, each connection connecting a pair of points, and a zoneset comprising a plurality of zones, each zone defining a series of points that are connected. The system comprises a user interface arranged to receive one or more user inputs from a user, wherein each of the one or more user inputs comprises a change to a zone. The system further comprises a processor arranged to perform analysis of each of the one or more user inputs to determine one or more consistent universal changes to the zoneset, and a display device arranged to present an output to the user comprising one or more of the determined consistent universal changes to the zoneset. The user interface is further arranged to receive a selection user input selecting a presented consistent universal change to the zoneset. The processor is further arranged to change the zoneset according to the selected consistent universal change to the zoneset.

According to a third illustrative embodiment, there is provided a computer program product for adapting a network topology, the network topology comprising a plurality of points, a plurality of connections, each connection connecting a pair of points, and a zoneset comprising a plurality of zones, each zone defining a series of points that are connected. The computer program product comprises a computer recordable medium having a computer readable program recorded thereon. The computer readable program, when executed on a computing device, causes the computing device to receive one or more user inputs from a user, wherein each of the one or more user inputs comprises a change to a zone. The computer readable program further causes the computing device to perform analysis of each of the one or more user inputs to determine one or more consistent universal changes to the zoneset, present an output to the user comprising one or more of the determined consistent universal changes to the zoneset, receive a selection user input selecting a presented consistent universal change to the zoneset, and change the zoneset according to the selected consistent universal change to the zoneset.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

Embodiments of the present invention, as well as a preferred mode of use and further objectives and advantages thereof, will now be described, by way of example only, with reference to the accompanying drawings, in which.

DETAILED DESCRIPTION

Figure 1:
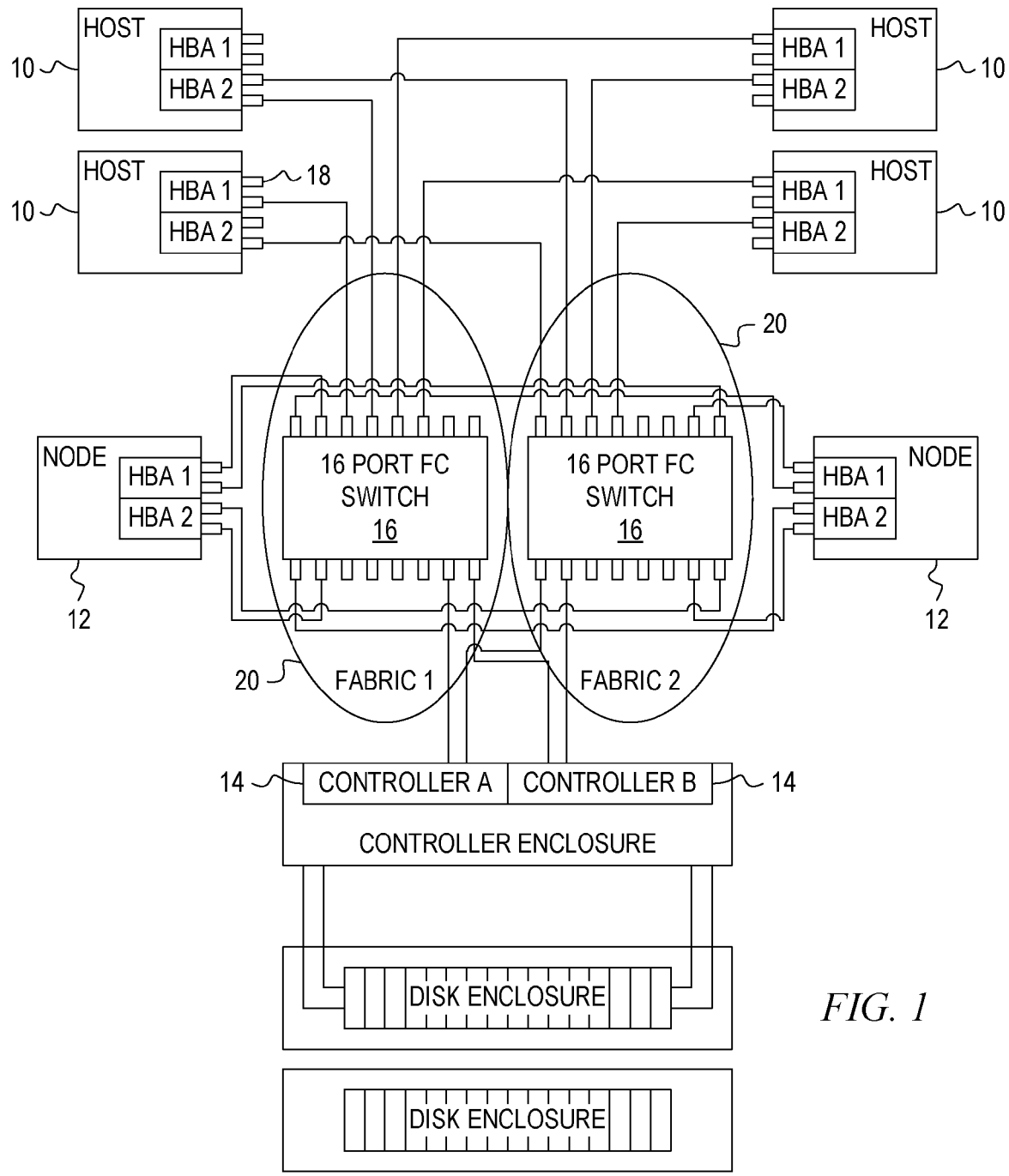
FIG. 1 is a schematic diagram of a physical network in which aspects of the illustrative embodiments may be implemented.

Owing to the illustrative embodiments described below, it is possible to assist a user who is changing a network topology, by extrapolating the changes that they are making in one area of the topology into consistent changes throughout the whole network (represented by the topology). The user is presented with options of universal changes to the zoneset, and can select an option and have the changes implied by the option automatically populated through the topology. The illustrative embodiments provide netting out a zone change to an operation and applying that operation to other zones automatically in a storage area network configuration. The illustrative embodiments present an improvement in the administration of the connectivity of a fibre channel storage area network, for example.

The step of changing the zoneset, according to the selected consistent universal change to the zoneset, may comprise adding points to or deleting points from one or more zones, and/or adding zones to or deleting zones from the zoneset. The user input provided by the administrator of the network can imply changes to individual zones in the zoneset, or indeed also the creation or deletion of entire zones.

The user input may comprise the addition of a point to a zone, and the performing of an analysis of the user input may comprise identifying one or more potential types of the new point. By identifying the type of point that has been added to a zone, operation of determining the nature of the global changes to the topology can be simplified, by extrapolating the connections of points of same type.

The user input may comprise the deletion of a point from a zone, and the performing of an analysis of the user input may comprise identifying one or more potential cancelled connections. When a user deletes a point from a zone, then the implication is that the user is cancelling a connection between the cancelled point and another point in the zone (although the user could be deleting the point in its entirety from the topology). By identifying the potential cancelled connections this can be used as a basis for determining potential consistent universal changes to the topology.

Preferably, the mechanism further follows presenting an output to the user comprising one or more of the determined consistent universal changes to the zoneset, receives a further user input, the further user input comprising a change to a zone, performs an analysis of the further user input to determine the universal changes to the zoneset that are still consistent, and presents a new output to the user comprising the universal changes to the zoneset still determined to be consistent. When the user makes their first change to the topology, then this potentially creates a large list of possible consistent universal changes to the zoneset, and the presentation of these to the user may lead the user to be unable to identify the universal change that they are trying to make to the topology. If the user does not select from the presented choices, but proceeds to make a further change, then it is an advantage to re-calculate the list of potential consistent universal changes, using the new information, and present a new, shorter, list to the user.

An example of a network is shown in FIG. 1, comprising various hosts 10, nodes 12, controllers 14 and switches 16. All of these components have multiple ports 18 which can be connected to other ports 18, and these ports 18 can be considered as points within a network topology. In this example, the switches 16 are independent from each other, and in network terms define separate fabrics 20. The complexity of these types of networks is such that carrying out the whole configuration of the network monolithically at one level of abstraction is typically too complicated for most users. To help with this problem the administration of each of the fabrics 20 is typically done in lumps, often termed "zones", each zone usually having one logical purpose that means something in human terms. All the points that are members of the same zone are thus configured to be able to communicate with each other in the storage area network.

A set of such zones is combined to describe the whole storage area network configuration in what is often called a "zoneset". As zones are added to the zoneset the effect of the connectivity is cumulative: i.e. two ports can communicate if they have one or more common zones in the active zoneset. In general, port names are long hexadecimal numbers, so are usually given "aliases" that are more human readable. For example the port alias called "N3P2" is the second port of node three, the port "CfredP2" is the second port of a controller called "fred", etc.

Users typically create zones for logical purposes with logical names. For example, in a fabric called "switchAFabric", there may be a zoneset called "TwoNodeConfigMarch2007", with a member zone called "TwoPortsFromEachNodeSeeControllerA", in which there is a set of ports as follows, {N1P1, N1P2, N2P1, N2P2, C1P1}, where N1=node 1, and C1=controller1, and P1=port1, etc. This has the intended effect of allowing two ports from each of the two nodes 12 to access controller1 as desired. This sort of zone is preferred as it has a clear logical purpose and is well named.

Most zones are of this form. However, this also has the side effect of allowing every subset of the zone to also be connected. So for example, the user really wanted the following connectivity effect also stated below from the above zone: {{N1P1, C1P1}, {N1P2, C1P1}{N2P1, C1P1}, {N2P2, C1P1}}, but also got as a side effect the connectivity set {N1P1, N2P2, N2P1, N2P1}. If this was a problem, it would be possible to replace the first zone as an equivalent set of multiple zones, thus {N1P1, C1P1}, {N1P2, C1P1}, {N2P1, C1P1}, {N2P2, C1P1} to prevent this. Usually the side effect of this connectivity of peers (in this case {N1P1, N2P2, N2P1, N2P1}) is not a problem and a user does not configure in this fashion as it is long winded and although exact, is actually less clear to "read" the listed zones than the first named example. This single example above would be repeated for all the other ports on the controller and for the other controllers.

The net result for this is that usually two port names for a node will each be co-present in many zones as a side effect of specifying their connection to some other port names(s). In addition, as these other zones are all trying to preserve redundancy as much as possible, and as the other component types will usually be in redundant pairs, then is it often the case that none of these zones will contain all the ports for a single class of devices (most will have 50% for dual-redundancy or 25% for four-way redundancy) so there will also still be a need for a specific zone to connect all the ports of the class of devices (for example, all the ports in a switched virtual circuit (SVC) cluster) should this be desired. This will add another set of two connections between the points.

This leads to one of the main problems with reliably and easily configuring storage area networks, which is that these inefficient but human readable zone configurations create a minor administration headache for the users. As the level of granularity in the "real world" is in terms of ports and the logical connectivity between ports, when carrying out changes to the zoning of a fabric 20, the user is usually trying to achieve end results at this conceptual level to logically separate or join two port names.

For example, if a user is splitting a cluster into two, for a human to do this, the task will have to be broken up into a number of achievable sub-tasks. A typical logical subtask is, for example, to disconnect the first ports on the two nodes N1P1 and N3P1. However these two ports are very likely to be co-members of multiple zones within the zoneset. There may be one zone aimed specifically at ensuring their connection, plus one or more zones that allow them to been seen by the same host HBA card, plus one or more zones connecting them to the same storage controller ports, etc. This means that if the user wishes to break the connectivity between two ports they must edit every zone that contains both ports and remove at least one of them. This is a tedious and possibly error prone task. As port names (and sometimes aliases) are easy to misread, then mistakes in either aliasing ports or editing port names lists are not uncommon and it is not difficult for a user to miss one of the required removals. Therefore, as most nodes, host and controllers have multiple ports, then splitting or joining machines in the network is a long winded and possibly error prone task, as the above must also be repeated for each port of a physical machine.

What is provided is a novel network administration feature. This feature will understand the net effect of administration actions taken "so far" by a user in a network admin session and offer the user the ability to extrapolate this to the rest of the network configuration. The extrapolation from a number of network administration user interface actions, to a change to the whole configuration is a feature that will save time and reduce errors for many common network administration tasks. The autocompletion of a task by extrapolation from one of more user interface tasks to a set of changes to multiple zones in a zoneset of a network fabric, which would be achieved by a number of further similar user interface actions, provides a significant processing efficiency and improves the accuracy of administration of the network. The user is able to review/confirm/tweak such changes before they come into effect.

Figure 2:
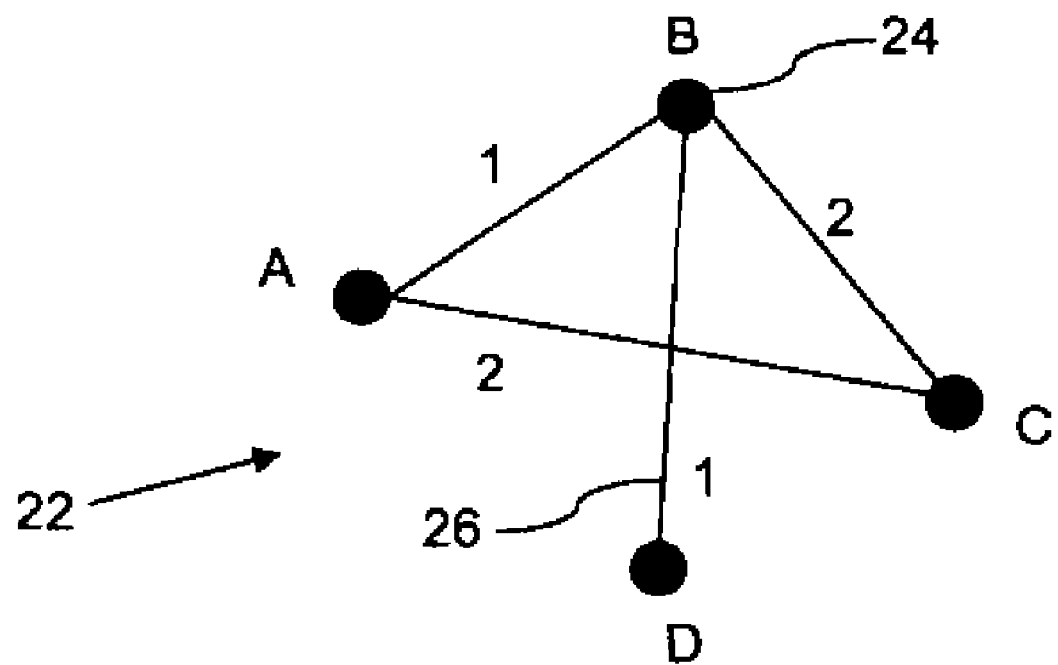
FIG. 2 is a diagram of a network topology in which aspects of the illustrative embodiments may be implemented.
Figure 2:
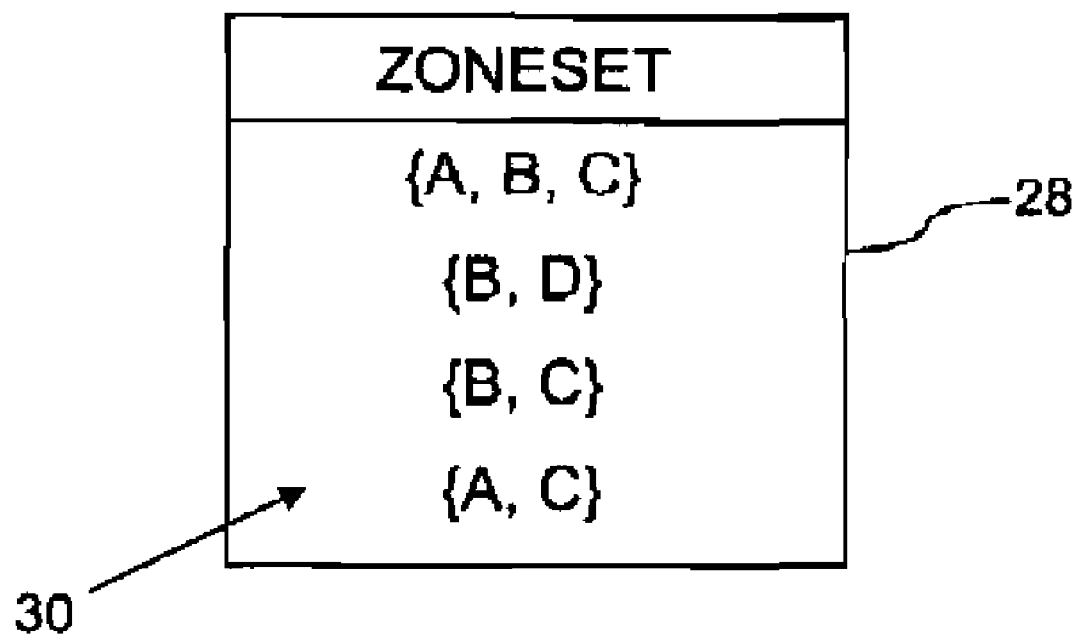

Conceptually, the network fabric configuration (the logical network topology) is held internally in fabric management software as a set of sets. An active zoneset is a set of zones, and a zone is a set of points (in the SAN technology field being port names). FIG. 2 shows an edge-labelled graph 22 of a network, with a zoneset for this topology 22, comprised of points 24 and edges 26. In terms of graph-theory, the configuration is a non-directed graph of connectivity between port names with each edge representing the connectivity as a result of one zone. So there will be an edge between two points 24 in the graph 22 for each zone that contains the pair of port names. To simplify the understanding, the points are named A, B, C and D, rather than using port names. More compactly, it is also possible to think of a graph that is 'weighted', with each edge having a 'count' of the number of zones that connect the two points 24 that the respective edge 26 links together. The zoneset 28 is shown for the specific topology 22, comprised of the individual zones 30. The network topology 22 effectively comprises a plurality of points 24, a plurality of connections 26, each connection 26 connecting a pair of points 24, and a zoneset 28 comprising a plurality of zones 30, each zone 30 defining a series of points 24 that are connected.

It can be seen that this connectivity graph can be normalised (i.e. have the redundancy stripped out) by removing duplicate edges and reducing all weights to one in the graph, so that ports are either not connected or connected with a single edge, without changing the effect on the network. Network management software will generally do the equivalent of this anyway, when remembering the connections between ports, the management software only needs to count up to one. However, for the user, the zoneset needs to be representable to the user.

When the user accesses the configuration application for the network topology, the software, as well as the 'as seen by the human' configuration, will have an idea of the 'normalized' single-edge-between-two-points connectivity graph. It is changes to this graph that the user is almost always trying to effect, even though they can only edit the un-normalized graph. When the user performs some user interface configuration action and decides to save it (or whatever other gesture is chosen to activate the extrapolation) the system will look at the differences between the two 'as-configured' graphs.

For example, for point to point pairings where the number of edges is decreased, the system will explore reducing the number of edges between these points to 0. For point to point pairings where the number of edges is increased, the system will explore making use of the properties of symmetry to add further edges. Further edges may be added that connect the same ports but added to further zones or indeed may connect two equivalent but different ports that are deduced using the properties of redundant symmetry resulting in a configuration that appears naturally balanced. The features of how this is achieved are described below in detail. The adaption to the management software is not extrapolating changes, which affect ports, to other ports in the same machine nor trying to deal with configuration at a machine level, it addresses extrapolating the changes made on one zone to multiple zones in the zoneset.

Figure 3:
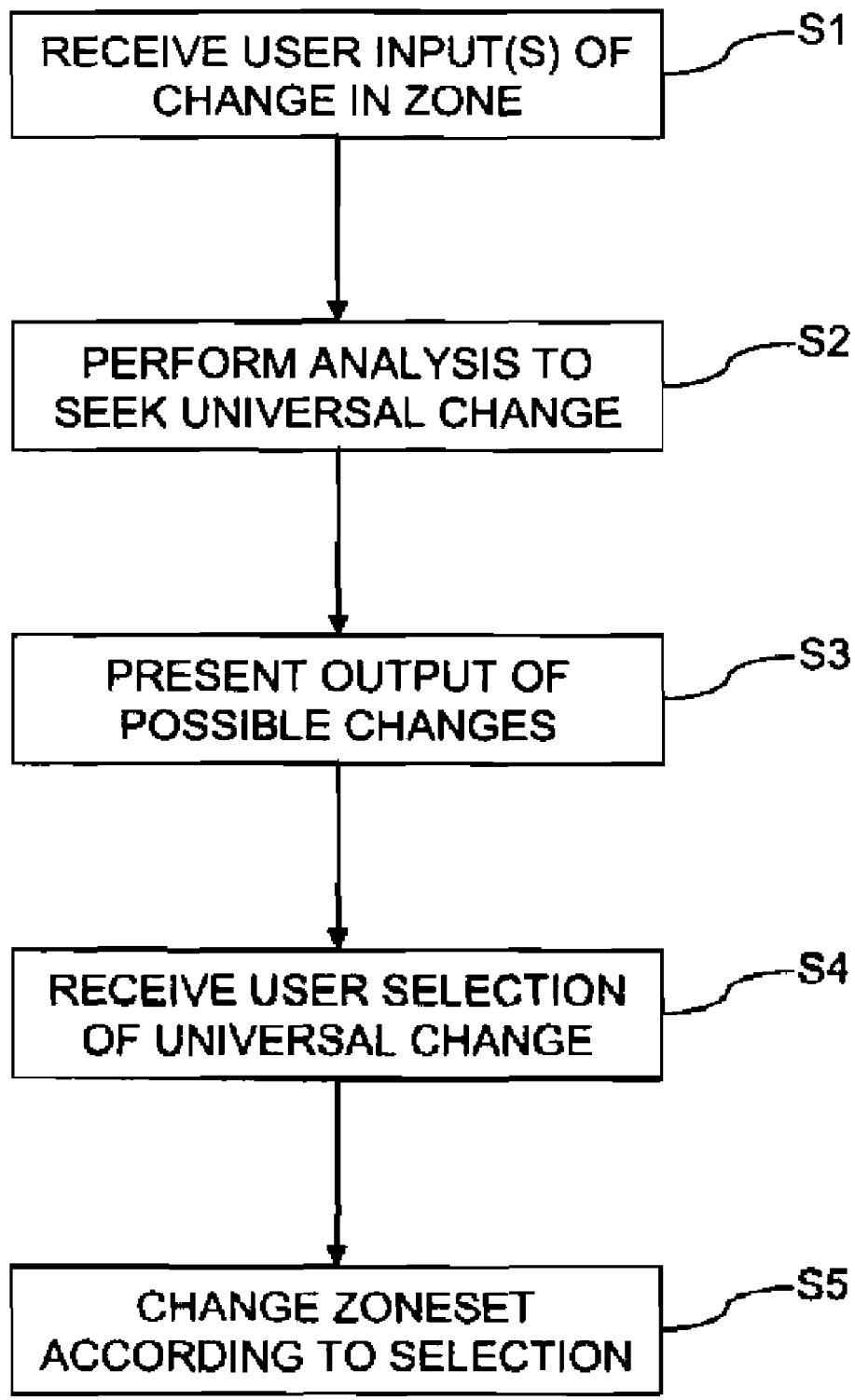
FIG. 3 is a flowchart illustrating operation of adapting a network topology in accordance with an illustrative embodiment.

FIG. 3 shows a flowchart of the operations carried out when a user is administering changes to a network topology, such as network topology 22, through a user interface of network management software, which may be located within the network, or may be a separate component from which the management of the network connections is performed.

The first step, S1, is the step of receiving one or more user inputs, each user input comprising a change to a zone 30. The zoneset 28 of the topology 22 will define multiple zones 30, and the user will begin their adaption of the topology 22 by making a change to one or more zones 30. The next step, S2, is the step of performing an analysis of each user input, to determine one or more consistent universal changes to the zoneset 28. The actual processing carried out in this step is covered in more detail below, but essentially the management component will extrapolate from the user changes one or more universal changes to the entire network 22.

In the example of FIG. 2 (which of course is a highly simplified topology 22, for explanation purposes), the user may access the zoneset 28, and delete the point C from the zoneset {A, B, C}. This implies one of three possibilities: that the user is deleting the point C from the network entirely (for example, in preparation for a hardware upgrade), that the user is removing the connection between points A and C, or that the user is removing the connection between points B and C.

The next step is the step, S3, of presenting an output to the user comprising the one or more determined consistent universal changes to the zoneset 28. In the example above, the user, after having deleted the point C from the zoneset {A, B, C}, will be presented through the GUI of the software the three options listed above. Then, at step S4, the software receives a selection user input, which is selecting a presented consistent universal change to the zoneset 28, and finally, at step S5, there is carried out the action of changing the zoneset 28 according to the selected consistent universal change to the zoneset 28. The user may indicate, for example, that the action being taken is the universal step of deleting the connection between points B and C. In that case, the management software will go through the zoneset 28 and delete the zone 30 that comprises {B, C}.

The mechanism works with a 'before' and 'after' description of the network configuration 22, with the difference between them representing the editing actions of the user. The management system can either be applied to kick in on each individual change made by the user, or to work with a set of changes to the configuration, with some gesture such as a save. Further embodiments of the system can make use of considering multiple related changes the user has made to be more certain of their intention, but the simplest embodiment of the system will process the user changes one at a time. In general therefore the management software is looking at a single change in the connectivity graph that represents either increased connectivity, when ports are added to a zone, or decreased connectivity, when a port has been deleted from a zone. Obviously the nature of the extrapolation that is going to be applied is different for each case.

Figure 4:
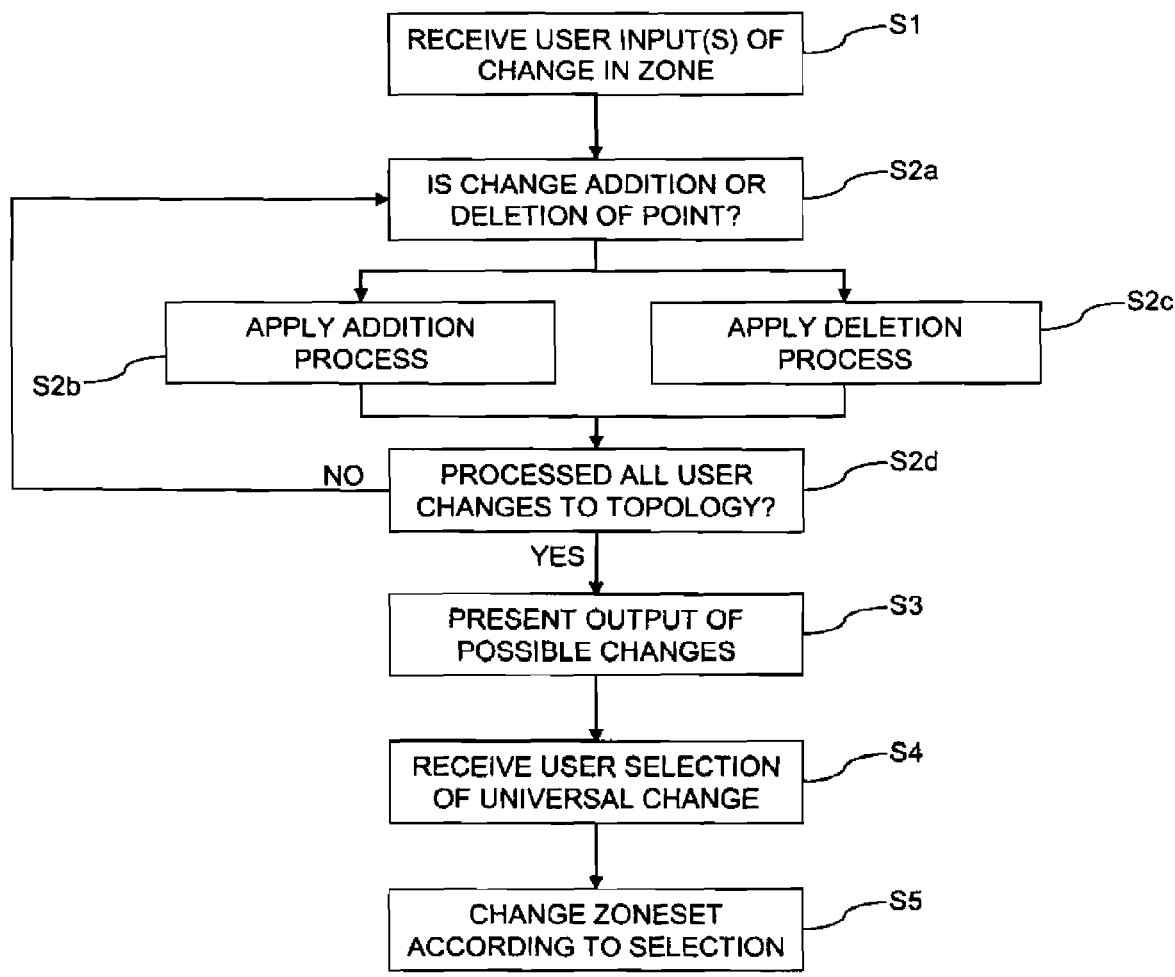
FIG. 4 is an embodiment of a flowchart illustrating operation of adapting a network topology.

FIG. 4 illustrates a further embodiment in which the step S2, of performing the analysis on the user instruction(s), has been broken down into four separate steps S2a to S2d. The first step S2a is to check whether the first (or only) user change to the topology 22 is either the addition or deletion of a point 24. Depending upon the answer to this check, the process moves to either step S2b (for an addition) or S2c (for a deletion). Once this user change has been analysed according to the respective step, then operation moves to step S2d, where a check is made to see whether there are further user changes to the topology 22 to be analysed. If there is a user change that has not yet been analysed, then operation returns to step S2a and continues in this loop. Once all of the user changes have been dealt with, then operation moves to step S3, and continues as per the flowchart of FIG. 3 above.

Step 2c provides for a reduction in the number of edges between points. For reducing the number of edges between points, one (or both) of the point names must be removed from each zone where the pair is a subset, if the user has deleted one point before the save, that will be that same point that is offered for removal from other zones that contain the pair. The removal of this point from other zones will have side effects, in that it will also reduce the connectivity between the removed point and other points in the same zone. The system can easily create a compensating zone that contains the removed point and the points apart from the one the system is trying to break connectivity in the edited zone.

As an example of this, consider the user action of the zoneset {{a, b, c}, {b, c, d}} being edited to be {{a, c}, {b, c, d}}, the intended effect is to disconnect b from something (either a or c). Only the effect of disconnecting b and c has a useful extrapolation here so the user would thus be offered the extrapolation to a new zoneset {{a, c}, {c, d}, {b, d}}, where {c, d} results from carrying forward the deletion of b on the second zone and {b, d} is a compensating zone that removes the side effects of deleting b from the zone {b, c, d} to stop that zone connecting b and c. The user interface would present the user with a message:

"I see you have reduced the connectivity, what are you trying to achieve?
1-disconnect a and b [no further action is required in this zoneset]
2-disconnect b and c [would you like to do this to other zones too, resulting in the zoneset: {{a, c}, {c, d}, {b, d}}?]"

The larger the zone, the more possible effects the user might be trying to achieve by deleting a point from it. The system can handle this methodically just giving more choices in the list above. However, if the user does a second deletion towards the same aim, the system will be able to tell what effect the user is trying to achieve. Each edit action will produce a list such as the above, and only effects that appear on the intersection of the lists will be offered to the user (or alternatively, they will appear first in a list which is sorted by the number of edits that contribute towards that goal). Thus the user can at his preference either pick from a longer list of actions or perform a second edit that can be used by the system to hone in on the intended global effect. The user will very quickly learn that editing a couple of mostly disjoint zones will usually allow the system to work out exactly what he is trying to achieve, and it is up to the user to choose to take the time to do this second edit or to choose from a longer lists of options.

The process for handling a deletion of a point can be defined in an algorithm, as follows:

---

1) For each edit-deletion{
produce a set of possible intended point pairs which is the deleted point paired with each of the other points in the specific zone
}
2) If there is more than one deletion, create a union of the sets above with each member having a count of the number of edit-deletions that contained the effect,
3) For each point pair{
    3.1) create a list of each zone that contains these two points - create new versions of them than do not contain the deleted point.
    3.2) create a list of each zone that contains these two points - create compensating zones that overcome the side effects of the new zones created in Step 3.1). These contain the deleted point and all the other points in the specific zone apart from the other point of the pair.
    3.3) Collect together the new set of zones that are the result of each point pair into a new proposed zoneset for this extrapolation.
}
4) Sort the effects/extrapolations by the number produced in step 2)
5) Offer these effects (and optionally display the would-be resulting zonesets) to the user in order of the count produced in step 2).
6) If the user chooses one of the effects then apply it (with optional confirmation of each zone change or addition).

Figure 5:
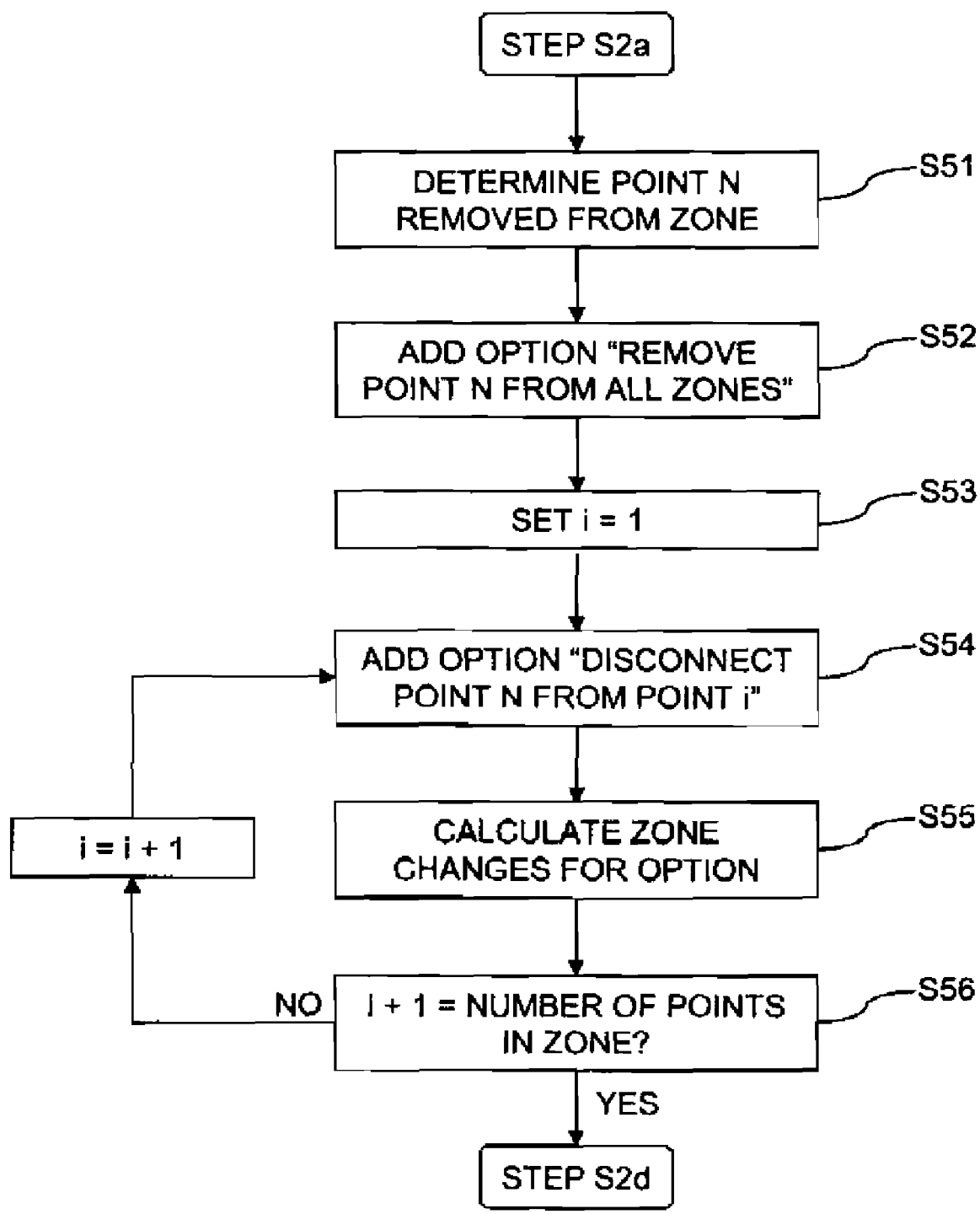
FIG. 5 is a flowchart illustrating operation of handling a deletion of a point from a topology in accordance with an illustrative embodiment.

FIG. 5 illustrates an alternative embodiment of handling a deletion of a point from a topology. The flowchart of FIG. 5 can be considered to be an expansion of the step S2c of FIG. 4. At step S51, there is the determination of the point that has been removed from the specific zone by the user. This point is referred to as point N. At step S52, the option "Remove point N from all zones" is added to the list of possible consistent universal changes that the user may be making. At step S53, a counting variable i is set to 1. At step S54, the next option "Disconnect point N from point i" is created. If the zone being dealt with is the zone {A, B, C, N}, where N is the deleted point, then this option will be created as "Disconnect point N from point A". The next step is step S55 of calculating the zone changed implied by this specific option. Once this is completed, then at step s56 a check is made on the variable i to determine whether i+1 is equal to the number of points in the zone, and if this check fails, then the i is incremented by 1 and the method returns to step S54, thereby creating the options for the other members of the zone. Once this has been completed, then the deletion process terminates back to step S2d of FIG. 4.

Figure 6:
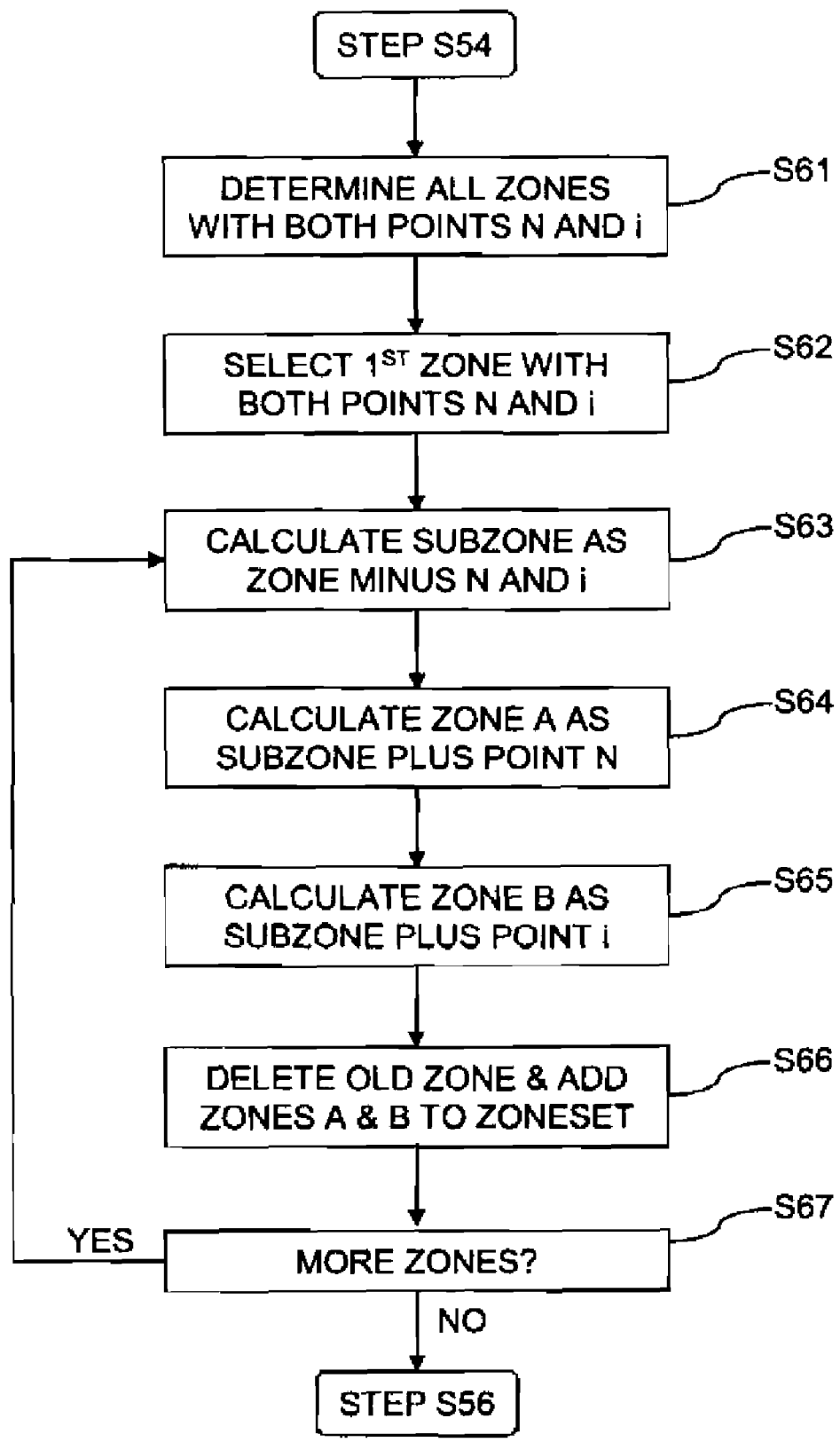
FIG. 6 is a flowchart illustrating operation of calculating zone changes in accordance with an illustrative embodiment.

The step S55 of calculating the zones changes implied by the option of disconnecting point N from point i is expanded in the flowchart of FIG. 6. The first step S61 is to determine all of the zones that contain both points N and i. At step S62, the first of these zones is selected. At step S63 a subzone is created that contains the original members of the zone minus the two points N and i. This subzone is purely a temporary construct used to calculate further zones and does not have independent existence.

Using the example above, the first zone is {A, B, C, N}, where N is the deleted point and i is point A, then this subzone will be {B, C}. At step S64, a new zone A is generated, comprising the subzone plus point N, which will be {B, C, N}. At step S65, a new zone B is generated, comprising the subzone plus point i, which will be {A, B, C}. At step S66, the zoneset is changed by deleting the old zone and adding in the new zones A and B. It can be seen from this example, that the first zone that the process will work on is the actual zone from where the user has deleted the point. At step S67 a check is made to see if there are any more zones containing N and i that have not yet been processed, and if there are, then the process returns to step S63 to repeat the steps S63 to S66 for the new zone.

The opposite case of the amendment to the topology is the addition of a point to a zone, which will cause an increase in the number of edges between points. For the case where an edit increases the number of connections between points, where one point has been added, one or more points must be added to further zones.

A well balanced, symmetric and redundant connectivity graph can be recognized by the symmetry of redundant components and the similarity of the multiple ports that are sharing one particular task. For example, each port in switched virtual circuit (SVC) point (SVC-SAN volume controller) is very likely to have connectivity that is very similar in terms of the types of things it speaks to, only with different boxes and different ports on those boxes. For example, in a finished configuration every port on an SVC point may be able to speak to exactly three storage controllers—each SVC port's switch is connected to exactly two ports on each controller but each SVC port is configured to perhaps one. It may be that in each SVC point the even ports are connected to the even ports on the controller and the odd ports are connected to the odd ports on the controller. For example, a user may be adding a new controller into a system. The controller will have four ports and two of them are being connected to this fabric. The user wants the effect that two ports from each of the two SVC points can see each port on the controller.

The user creates two new aliases and adds one of the aliases to a zone that is used to connect half the SVC ports to half the storage controllers ports.
new aliases "NewController3P1", "NewController3P2"
zone "SVCOddPortsToControllerOddPorts" is edited to go from
{U1P1, U1P3, U2P1, U2P3, C1P1, C2P1} to
{U1P1, U1P3, U2P1, U2P3, C1P1, C2P1, NewController3P1}

In one embodiment of looking for the universal change implied by the local change, the system will look at the edited zone and work out the profile for the zone and the types of the points in the zone. The profile for the zone can be defined as being, for example, its size and to the type of points that are in it. A point type can be defined completely independently of its type in the real world, but only as a collection of the identifying facts that can be determined from the fabric configuration information, these facts can be things such as the number of other points to which it is connected, the number of zones in which this point appears and the type of the points to which it is connected.

The exact facts used to construct the type do not really matter; type serves to try to differentiate the classes of points in the system. By means of example, the number of zones and the number of points to which a point is connected will be used in the following example. Metadata from the point or aspects of the alias name could be used but this is not necessary.

For example, in a topology with two hosts each with two ports, two SVCs each with four ports, and two controllers each with two ports and two switches, it is possible to construct the following types of points (every port being a point), using the shorthand 9.3 to mean that a point is connected to nine other points and in three zones:
Type A=point connectivity is two, zones membership is one, always with the zone profile {6.3. 6.3, 2.1}, these are host's ports.
Type B=point connectivity is six (3svc+1host+2controller) zones membership is 3, these are SVC ports.
Type C=point connectivity is five (4svc ports+another controller) zones membership is one (all svc+this controller) always with the profile {6.3, 6.3, 6.3, 6.3, 5.1, 5.1}, these are controller ports.

From this processing it is possible to see that the zones also fit into types as well {B, B, A}, {B, B, B, B} and {B, B, B, B, C, C}. This can be extrapolated so that when the user adds a point to a zone of a particular type, it can be assumed that the user is quite likely to want to add an equivalent (or the same) thing to the other zones of the same type.

So when zone {U1P1, U1P3, U2P1, U2P3, C1P1, C2P1, NewController3P1} appears, the system sees that in this zone there are two types of point, being type B, which are the SVC ports, and another with type C, which are the storage controller ports. It is most likely that this newly appearing point is either another B or a C.

Note that it is also possible that the type is a new point type for that zone or a new type altogether, but these are less likely. The system is just generating a list of actions that will be proposed to the user. The system will propose multiple possibilities and is not expected to be 100% right 100% of the time. Just the set of proposed automated actions containing one action that reduces the amount of manual editing is advantageous. The system does not need to generate the final configuration nor be scared of adding a proposal to the list which is not an action that the user wants. Also, it may well be that a network configuration edit session is done with a number of actions and that the system providing the short cuts is only invoked during a few of them.

If the new point is a new "B" then as these are all in three zones the new alias needs to be added to two further zones (thereby connecting to a host and connecting to the other SVCs' ports. If the point is a new "C" then as these are all in one zone the new alias needs to be added to no further zones. So the user is asked "New alias NewController3P1 has been added to the zoneset to zone XXX, do you wish to add the other new alias in a similar manner?" If the user answers yes to the questions, then the system looks at the old and new zone.

The edited zone went from {"B"#1, "B"#3, "B"#5, "B"#7, "C"#1 "C"#3} to {"B"#1, "B"#3, "B"#5, "B"#7, "C"#1 "CB"#3, NewAlias1}, where "B"#1 is the first point of type B etc. Owing to the desirable properties of symmetry the system knows it is very likely for the user to wish to get another zone with the same profile, i.e. {B, B, B, B, C, C}, and add the other new alias to it to turn it into a {B, B, B, B, C, C, NewAlias1} zone. Another option offered would be to add the same new point that the user added. In this example, there is only one other such zone (the zone that handles connecting the remaining half of the SVC ports to their controllers' ports) and the system offers the operation of adding the other new alias to the user for automatic implementation.

The very fact that there is another {B, B, B, B, C, C} zone in the system makes the alternative operation of adding the second new alias into the same zone as the first one unattractive as this would result in two zones that are dissimilar and also 'splitting' the group of ports that have the "5.1" profile (type C) into a "7.1" and a "5.1." set, as it is unlikely that there are new types of points and an increase in the number of types of zones. Increasing the number of types of ports is a lot less attractive than increasing the connectivity of one type (for example, "5.1" becoming "6.1").

It is also possible that the system can look ahead to the results of the proposed action and work of the resulting type of the alias it is adding. The system can use the type to look at how other points of the same type are distributed amongst the zones. This is demonstrated with the following example. There are ports of type "B" (8 SVC ports) named a, b, c, d, e, f, g and h. It might be observed that in zones of a particular type, the zones contain two of these point types. The system can deduce across the zones seeing that there are four such zones of that type and between them they contain the complete set of points of type B, and that the subsets are disjoint and across zones there are correlating subgroups. So a and e always appear together when a subset of size two is desired and a, c, e, g when a subset of four, this is due to the desired result being 4-way or 2-way redundancy.

Therefore, when adding a new point of a particular type (or multiple points of a type) these rules can be deduced from the configuration and used to extend the user edit in the direction that conforms to the rules as they are apparent in the actual configuration. For example, if each point of a particular type appears in a zone that contains no other points of this type then adding a new point that the system guesses may be of this type will cause the action of adding a new zone containing this new point to the configuration to be proposed. If zones of this type being added also contain a half-disjoint subset of point of type B, (there being two such subsets called: wwpnB.HalfSubset1.A and wwpnB.HalfSubset1.B, for example) then if wwpnB.HalfSubset1.A appears in three zones of this type and wwpnB.HalfSubset1.B appears in two zones of this type, then the proposed zone will be offered to contain the new WWPN and the members of wwpnB.HalfSubset1.B.

A simple embodiment of the processing of the addition of a point to a zone is expressed as follows:
1) identify the (possibly new) point being added to the zone
2) try to resolve the type of the new point by
   looking at other types of point in the zone
   looking at sets of points that may not be complete (odd sizes)
   looking at other zones that this edited zone may be going to end up like.
3) Once the type of the point is guessed at (and there can be >1 proposals) examine how such point types are spread across the existing zones
4) Create a proposal(s) that will mean that this new point has a profile that is similar to others of the same type and which results in the sort of symmetry, disjointedness and correlation that is typically present in most network topology configurations.
   Find type
   Resolve how many zones such a point type is in and create a list
   For this point for each member of the list of zones that such point appears to be in.
     search for an existing zone that satisfies the profile
     if not found
       search for a zone that the point could be added to, to fit the profile and add it if found
       if not found
         create a new zone
         determine the other members of the zone using the symmetry, completeness, disjointness & correlation rules described above.
5) Offer a list of these proposals to the user for selection and application. For each similar edit, someone familiar with the area can easily see the extension of the above example to how it fits adding new hosts, new SVC points or new controllers.

Figure 7:
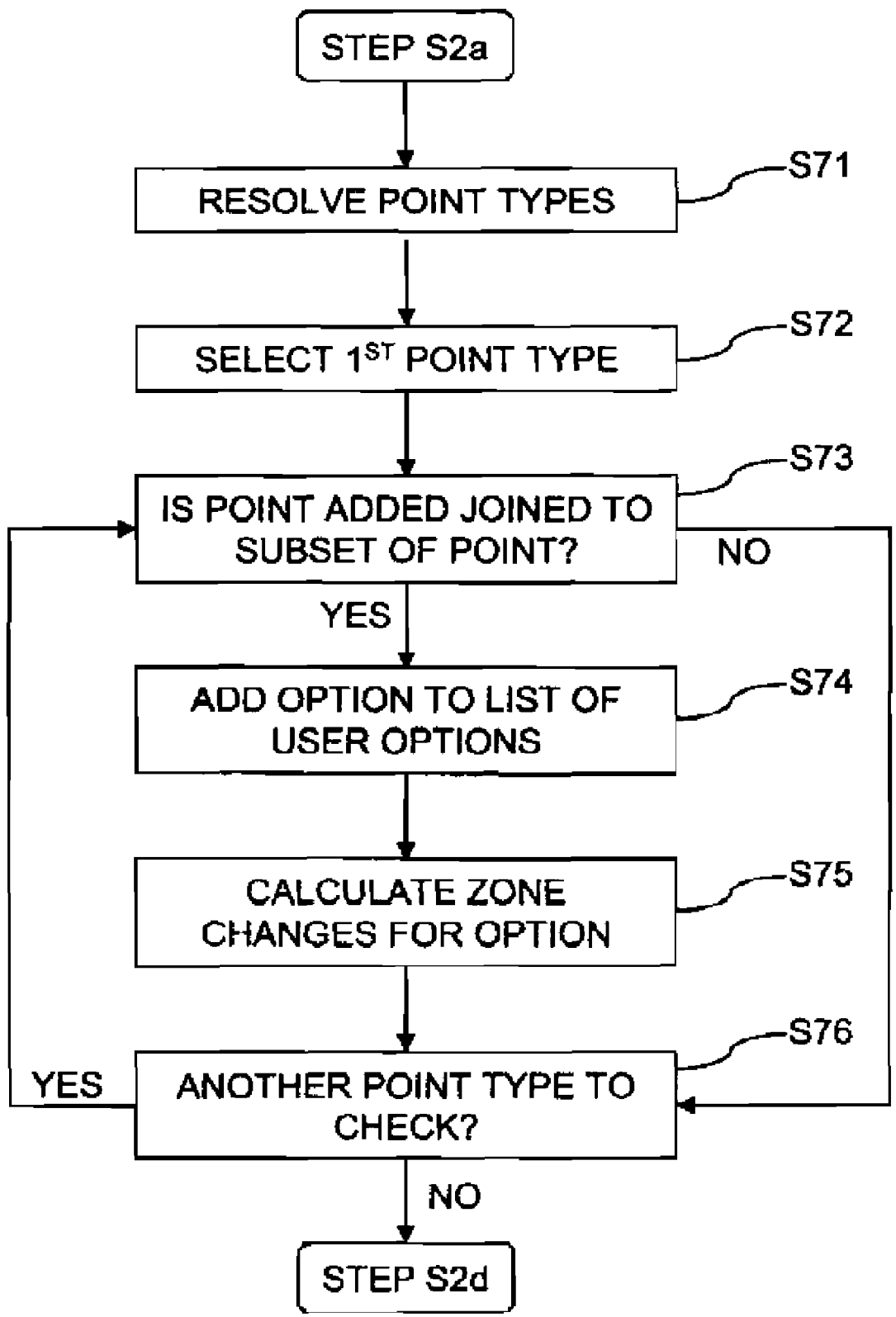
FIG. 7 is a flowchart illustrating operation of handling an addition of a point to the topology in accordance with an illustrative embodiment.

FIG. 7 illustrates operation of the addition of a point to a zone by a user in accordance with an illustrative embodiment. This operation is an expansion of the step S2b of FIG. 4. The first step S71 is the step of resolving the types of point within the configuration. This step is discussed in more detail below, with reference to FIG. 8. At step S72, the first point type is selected. Then at step S73 a test is made that determines if the point just added is connected to a subset of the points that would determine that the point added is of the specific type. This step is discussed in more detail below, with reference to FIG. 9. If the answer is no, then operation moves to step S76.

If the answer is yes, then operation moves to step S74, where the option is added to the list of user options, and then operation moves to step S75, where the effect of the added point being of the specific type is calculated. This step is discussed in more detail below, with reference to FIG. 10. The process then moves to step S76, where it is determined whether there is another point type to be checked, and if there is, then operation returns to step S73; otherwise, operation terminates.

Figure 8:
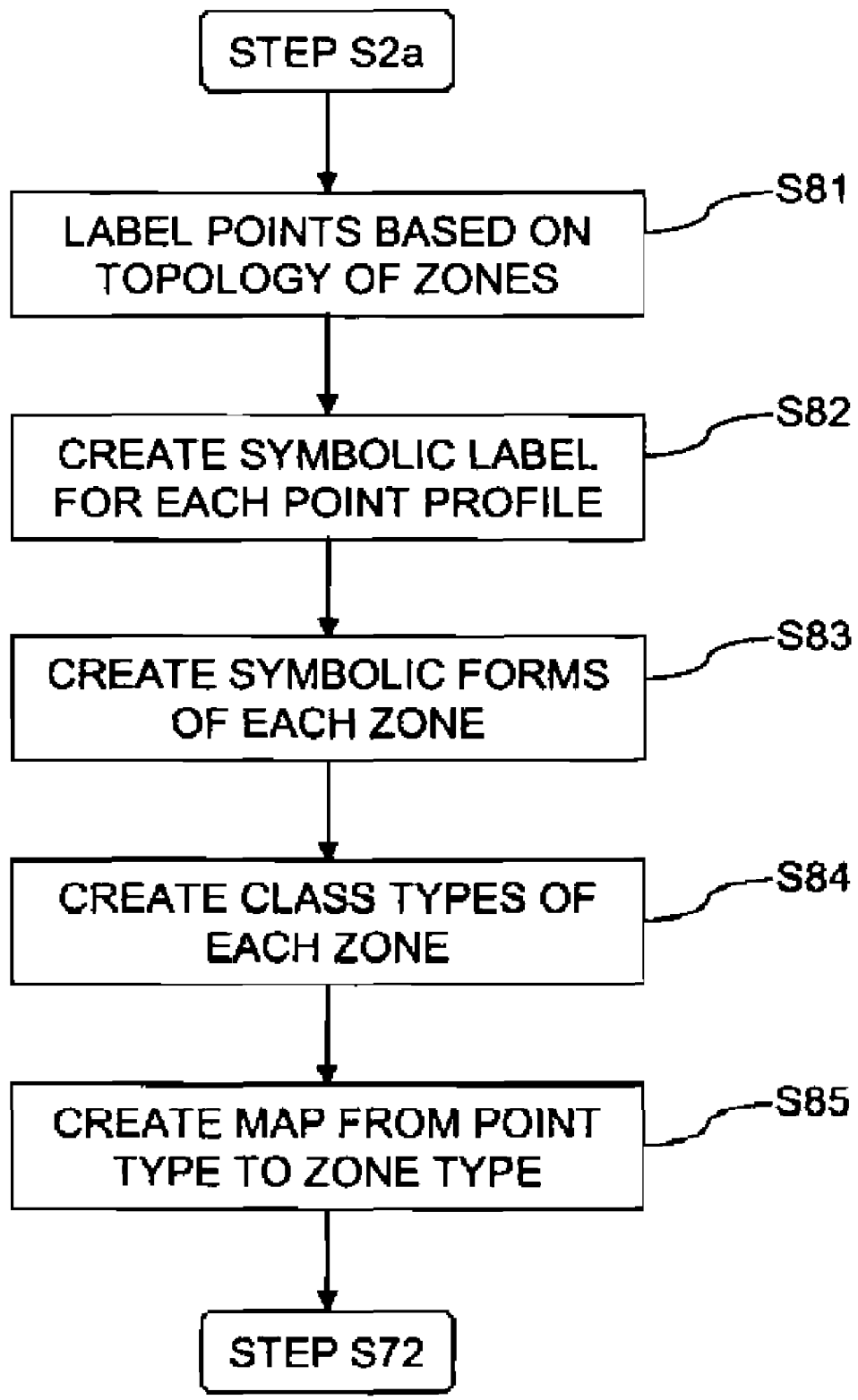
FIG. 8 is a flowchart illustrating operation of resolution of point types in accordance with an illustrative embodiment.

The process step S71 of FIG. 7, the resolution of the point types, is expanded by the flowchart of FIG. 8. The steps of this resolution start with step S81, which is the step of labelling the points based on the topology of the unedited zones. This step comprises four substeps as follows:
1. Unedited zones are labelled by size into classes.
2. Points are labelled by membership of zones of particular size.
3. Points are labelled as belonging to particular components, and
4. Unedited zones are labelled by the number of distinct components present.

The next step is the step S82, which comprises the creation of a symbolic label (using A, B, C etc.) for each distinct profile of point. At step S83, there is created symbolic/abstract equivalent of existing zones of the form {A, A, A, B, B, B}, where specific named points are replaced with their type label. This is then used to create class types of zone, at step S84, using labels Z, Y, X for each distinct symbolic zone. For example the type Z may refer to all zones of the form {A, A, A, B, B, B}. Finally, at step S85, there is created a map from point type to zone type. So for example point type A is a member of zones of type Z and X. This creates the categorisation of the points.

Figure 9:
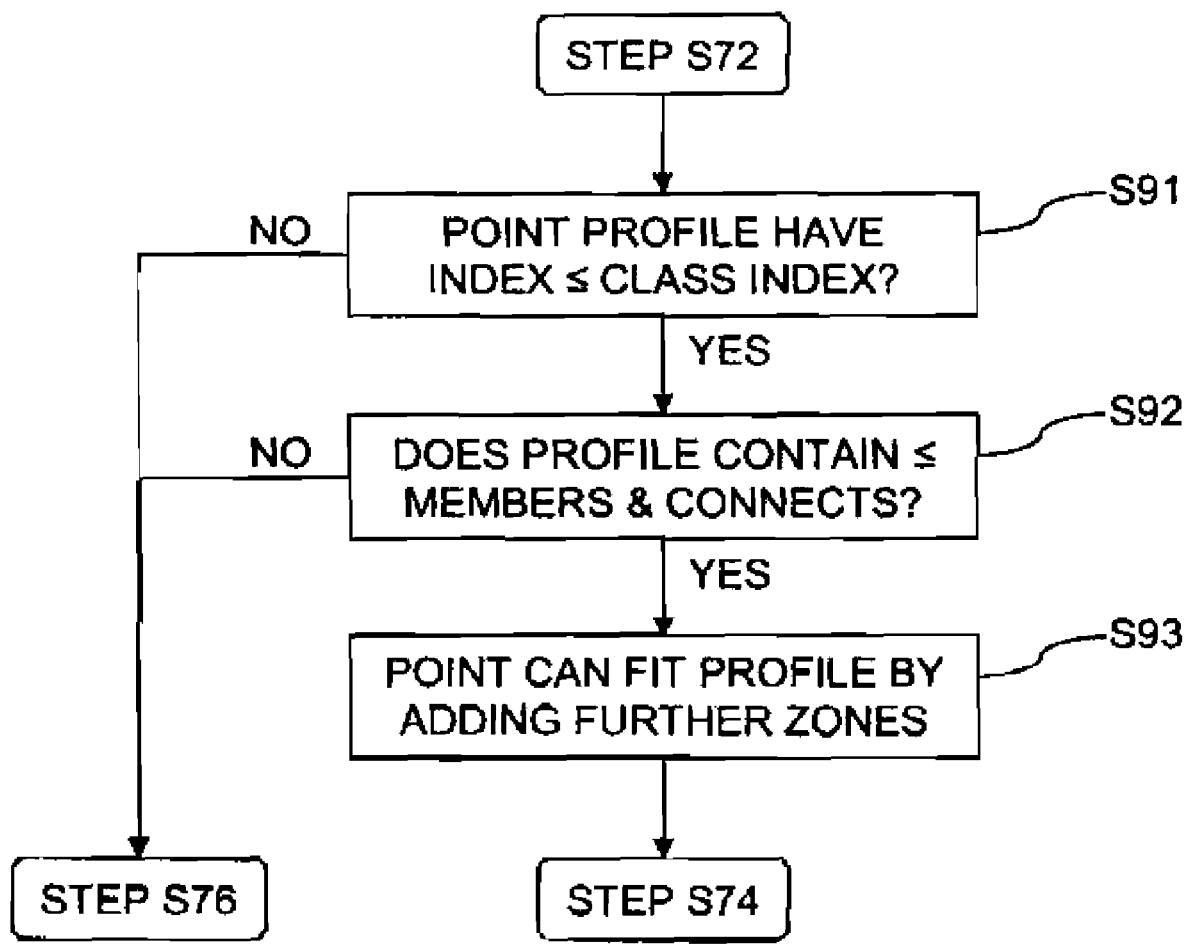
FIG. 9 is a flowchart illustrating operation of determining if a point being added is connected to a subset of the points that would determine that the point added is of a specific type in accordance with an illustrative embodiment.

The operation of step S73 of FIG. 7 is expanded in FIG. 9. This operation determines whether the point that the user is adding to a zone in the topology is of the point type currently being tested. In the first pass through the flowchart of FIG. 7, the first point type selected in the step S72 is the one being tested in step S73. Each point type in turn is tested for the new point added by the user.

At step S91 there is a check made to see if the profile for the point has each index in its profile less than or equal to the index of this class of point. If this is the case, then operation continues; otherwise, operation terminates by returning to step S76 of FIG. 7. The next step is to test whether the profile contains the same or a subset (fewer) memberships and connectivity indexes than members of the class. Again, if this is the case, then operation continues; otherwise, operation terminates by returning to step S76 of FIG. 7. At step S93, the new point can be made to fit the current profile by adding it to further zones. The defined point profile is a candidate for the new point, and operation returns to step S74 of FIG. 7, where the option is added, at step S74.

Figure 10:
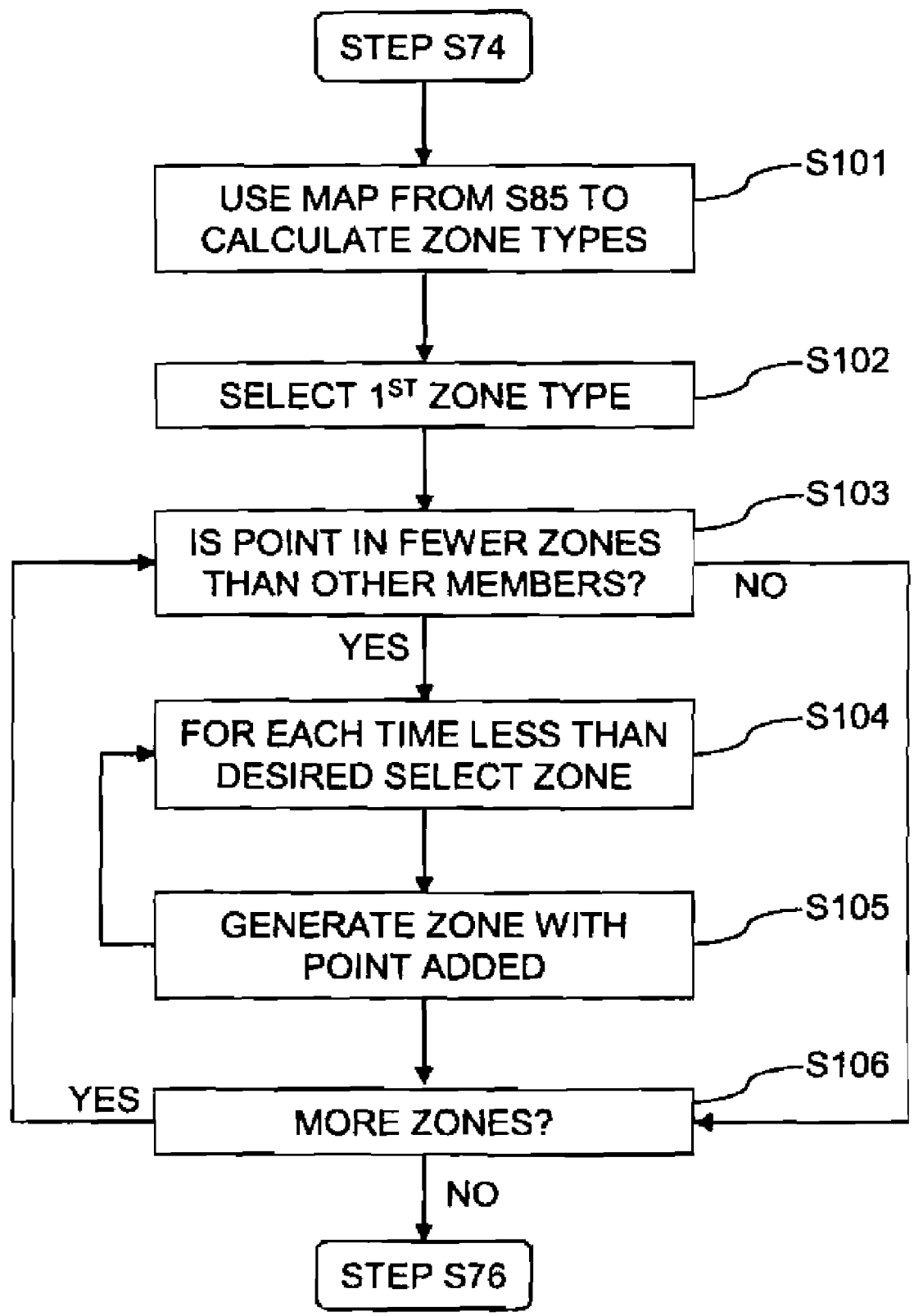
FIG. 10 is a flowchart illustrating operation of calculating the zone changes that correspond to the determined type of the added point in accordance with an illustrative embodiment.

FIG. 10 is an expansion of the step S75 of FIG. 7, which is the step of calculating the zone changes that correspond to the determined type of the added point. In FIG. 10, at step S101, the map generated at step S85 of FIG. 8 is used to calculate a list of zone types that the new point should be in. At step S102, the first of these zone types is selected. Then, at step S103, a check is made to see if the new point is in fewer zones of this type than other members of the desired class. If no, then the process moves to step S106. If yes, then for each time/count less than the desired number there is selected a new zone of the correct class of which the point is not a member (step S104), and there is generated a zone with the point added, at step S105. These two steps are repeated for each count less than desired. Operation then moves to step S106, and if there are further zone types of which the new point is perceived to be a member, then operation returns to step S103 and works through steps S103 to S105 again for the new zone type. When these are exhausted, then operation terminates, returning to step S76 of FIG. 7.

Figure 11:
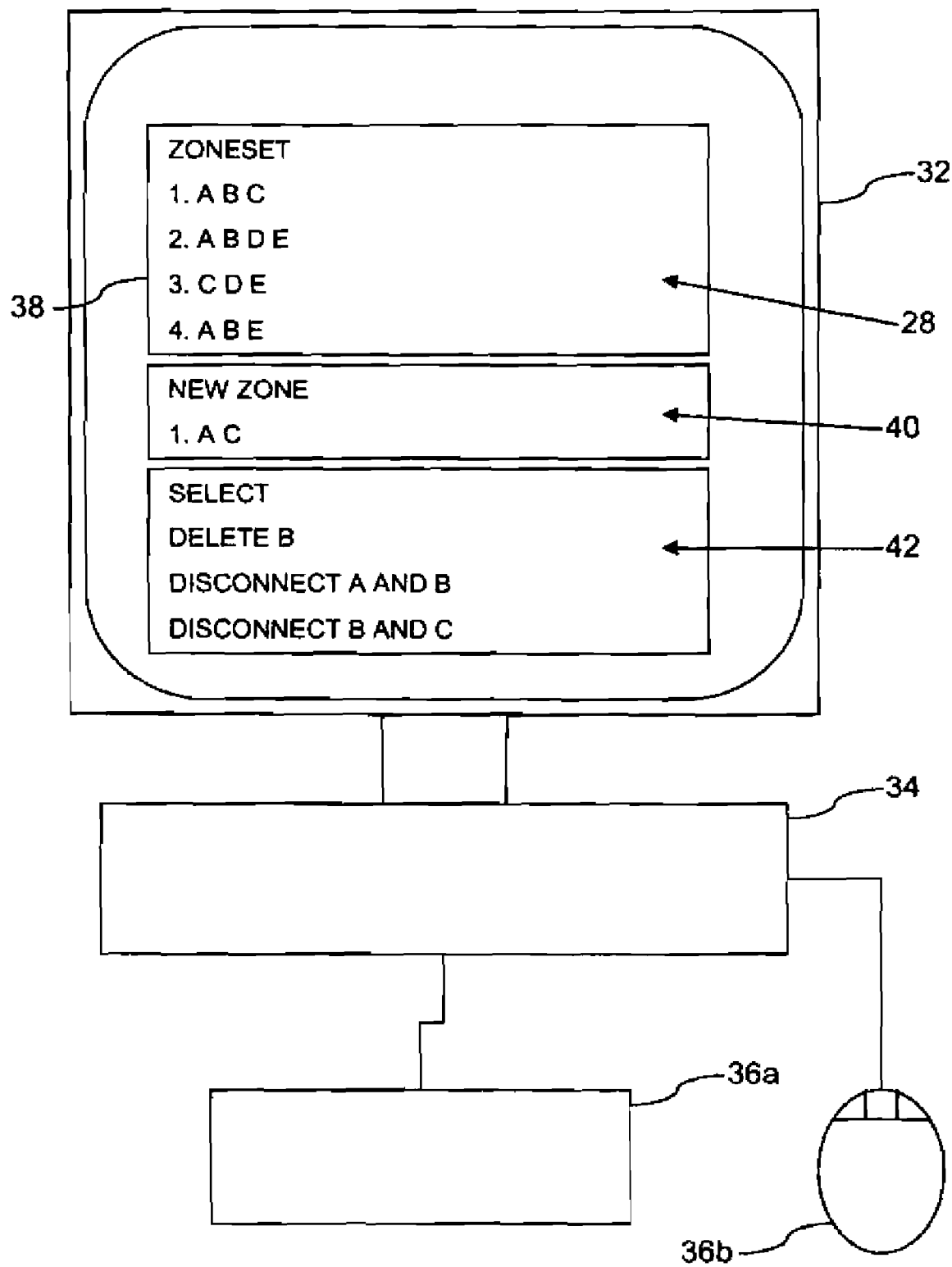
FIG. 11 is a schematic diagram of a system for adapting the network topology in accordance with an illustrative embodiment.

An example of the user interface to the administration application that can be used to adapt the network topology is shown in FIG. 11. The system comprises a display device 32, a processor 34, and user interfaces comprising a keyboard 36a and a mouse 36b. The system may comprise a conventional desktop computer, as shown in this depicted example. The user interface 38 to the network topology management software is shown on the display device 32. In this case, a zoneset 28 comprising four zones is shown, and the user is amending zone 1 to create a new zone 40. The output 42 is provided to the user, which allows the user to choose a global action based upon extrapolations of the user action.

The system shown in FIG. 11 is an example of a computing device, such as a conventional desktop computer, as described above. As generally known in the art, a computing device minimally comprises a processor and a computer recordable medium, such as a memory or persistent storage, for example. The compute recordable medium has recorded thereon a computer readable program, which causes the processor, and hence the computing device, to perform the operations of the illustrative embodiments described above.

The invention claimed is:

1. A method of adapting a network topology, the network topology comprising a plurality of points, a plurality of connections, each connection connecting a pair of points, and a zoneset comprising a plurality of zones, each zone defining a series of points that are connected, the method comprising:
   receiving a plurality of user inputs from a user, wherein each of the plurality of user inputs comprises a change to a zone;
   performing analysis of the plurality of user inputs to determine one or more consistent universal changes to the zoneset based on extrapolations derived from connectivity graphs, wherein the extrapolations comprise analyzing changes in edge connectivity between at least two points across more than one zone, the changes caused by an addition or removal of at least one point from a zone in the zone set, to generate an output;
   presenting the output to the user comprising one or more of the determined consistent universal changes to the zoneset;
   receiving a selection user input selecting a presented consistent universal change to be propagated to other zones in the zoneset; and
   changing the zoneset according to the selected consistent universal change to be propagated to the other zones in the zoneset, wherein the one or more of the determined consistent universal changes effect a change to the other zones in the zoneset consistent with the one or more user inputs.

2. The method of claim 1, wherein changing the zoneset according to the selected consistent universal change to the zoneset comprises adding points to or deleting points from one or more zones.

3. The method of claim 1, wherein the plurality of user inputs comprise addition of a new point to a zone, and wherein performing analysis of the plurality of user inputs comprises identifying one or more potential types of the new point.

4. The method of claim 3, wherein the one or more consistent universal changes to the zoneset comprise one or more universal changes to the zoneset based on the one or more potential types of the new point.

5. The method of claim wherein the plurality of user inputs comprise deletion of a point from a zone, and wherein performing analysis of the plurality of user inputs comprises identifying one or more potential cancelled connections.

6. The method of claim 1, further comprising:
presenting an output to the user comprising one or more of the determined consistent universal changes to the zoneset;
receiving a further user input, wherein the further user input comprises a change to a zone;
performing analysis of the further user input to determine universal changes to the zoneset, within the one or more consistent universal changes to the zoneset, that are still consistent with the plurality of user inputs and the further user input; and
presenting a new output to the user comprising the universal changes to the zoneset still determined to be consistent with the plurality of user inputs and the further user input.

7. The method of claim 1, wherein changing the zoneset according to the selected consistent universal change to the zoneset comprises adding zones to or deleting zones from the zoneset.

8. A system for adapting a network topology, the network topology comprising a plurality of points, a plurality of connections, each connection connecting a pair of points, and a zoneset comprising a plurality of zones, each zone defining a series of points that are connected, the system comprising:
a user interface arranged to receive a plurality of user inputs, wherein each of the plurality of user inputs comprises a change to a zone;
a processor arranged to perform analysis of the plurality of user inputs to determine one or more consistent universal changes to the zoneset based on extrapolations derived from connectivity graphs, wherein the extrapolations comprise analyzing changes in edge connectivity between at least two points across more than one zone, the changes caused by an addition or removal of at least one point from a zone in the zone set, to generate an output; and
a display device arranged to present the output to the user comprising one or more of the determined consistent universal changes to be propagated to other zones in the zoneset,
wherein the user interface is further arranged to receive a selection user input selecting a presented consistent universal change to the zoneset, and wherein the processor is further arranged to change the zoneset according to the selected consistent universal change to the zoneset, wherein the one or more of the determined consistent universal changes effect a change to other zones in the zoneset consistent with the one or more user inputs.

9. The system of claim 8, wherein the processor is arranged, when changing the zoneset according to the selected consistent universal change to the zoneset, to add points to or to delete points from one or more zones.

10. The system of claim 8, wherein the one or more user comprise addition of a new point to a zone, and wherein the processor is arranged, when performing analysis of the plurality of user inputs, to identify one or more potential types of the new point.

11. The system of claim 10, wherein the one or more consistent universal changes to the zoneset comprise one or more universal changes to the zoneset based on the one or more potential types of the new point.

12. The system of claim 8, wherein the plurality of user inputs comprise deletion of a point from a zone, and wherein the processor is arranged, when performing analysis of the plurality of user inputs, to identify one or more potential cancelled connections.

13. The system of claim 8, wherein the user interface is further arranged to receive a further user input, wherein the further user input comprises a change to a zone, wherein the processor is further arranged to perform analysis of the further user input to determine universal changes to the zoneset, within the consistent universal changes to the zoneset, that are still consistent with the plurality of user inputs and the further user input, and wherein the display device is further arranged to present a new output to the user comprising the universal changes to the zoneset still determined to be consistent with the plurality of user inputs and the further user input.

14. The system of claim 8, wherein the processor is arranged, when changing the zoneset according to the selected consistent universal change to the zoneset, to add zones to or to delete zones from the zoneset.

15. A computer program product for adapting a network topology, the network topology comprising a plurality of points, a plurality of connections, each connection connecting a pair of points, and a zoneset comprising a plurality of zones, each zone defining a series of points that are connected, the computer program product comprising a non-transitory computer readable medium having a computer readable program, wherein the computer readable program, when executed on a computing device, causes the computing device to:
receive one or more user inputs from a user, wherein each of the one or more user inputs comprises a change to a zone;
perform analysis of each of the one or more user inputs to determine one or more consistent universal changes to the zoneset based on extrapolations derived from connectivity graphs, wherein the extrapolations comprise analyzing changes in edge connectivity between at least two points across more than one zone, the changes caused by an addition or removal of at least one point from a zone in the zone set, to generate an output;
present an output to the user comprising one or more of the determined consistent universal changes to the zoneset;
receive a selection user input selecting a presented consistent universal change to be propagated to other zones in the zoneset; and
change the zoneset according to the selected consistent universal change to the zoneset, wherein the one or more of the determined consistent universal changes effect a change to other zones in the zoneset consistent with the one or more user inputs.

16. The computer program product of claim 15, wherein changing the zoneset according to the selected consistent universal change to the zoneset comprises adding points to or deleting points from one or more zones.

17. The computer program product of claim 15, wherein the plurality of user inputs comprise addition of a new point to a zone, and wherein performing analysis of the plurality of user inputs comprises identifying one or more potential types of the new point.

18. The computer program product of claim 15, wherein the plurality of user inputs comprise deletion of a point from a zone, and wherein performing analysis of the plurality of user inputs comprises identifying one or more potential cancelled connections.

19. The computer program product of claim 15, wherein the computer readable program further causes the computing device to:
- present an output to the user comprising one or more of the determined consistent universal changes to the zoneset;
- receive a further user input, wherein the further user input comprises a change to a zone;
- perform analysis of the further user input to determine universal changes to the zoneset, within the one or more consistent universal changes to the zoneset, that are still consistent with the plurality of user inputs and the further user input; and
- present a new output to the user comprising the universal changes to the zoneset still determined to be consistent with the plurality of user inputs and the further user input.

20. The computer program product of claim 15, wherein changing the zoneset according to the selected consistent universal change to the zoneset comprises adding zones to or deleting zones from the zoneset.

* * * * *